May 18, 1954 F. G. PALIUCA 2,678,862
TYPEWRITER SUPPORT
Filed Oct. 1, 1951 3 Sheets-Sheet 1

Frank G. Paliuca
INVENTOR.

BY *Clarence A. O'Brien*
*and Harvey B. Jacobson*
Attorneys

May 18, 1954   F. G. PALIUCA   2,678,862
TYPEWRITER SUPPORT
Filed Oct. 1, 1951   3 Sheets-Sheet 2
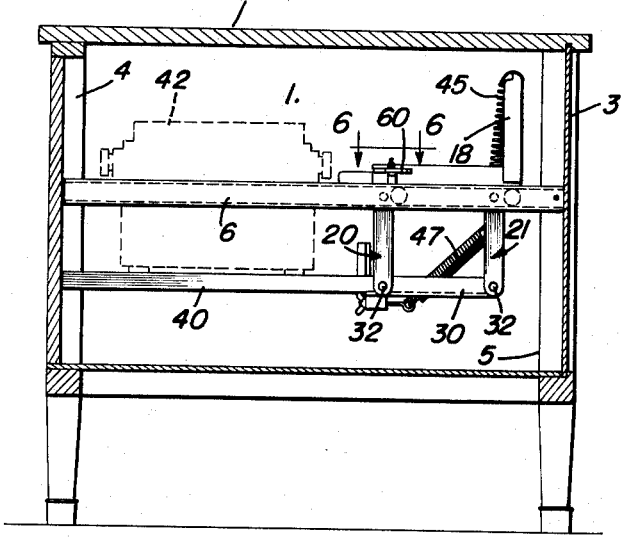
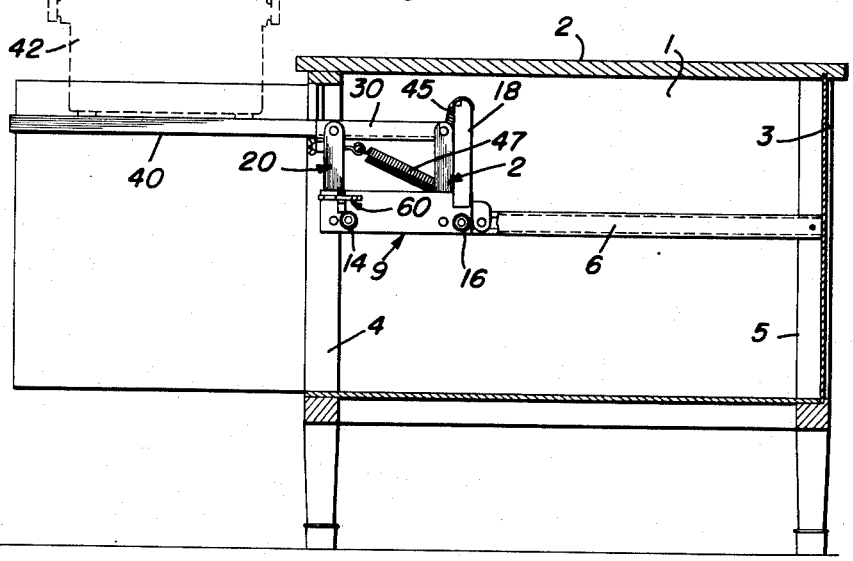
Frank G. Paliuca
INVENTOR.
BY May 18, 1954
F. G. PALIUCA
2,678,862
TYPEWRITER SUPPORT
Filed Oct. 1, 1951
3 Sheets-Sheet 3
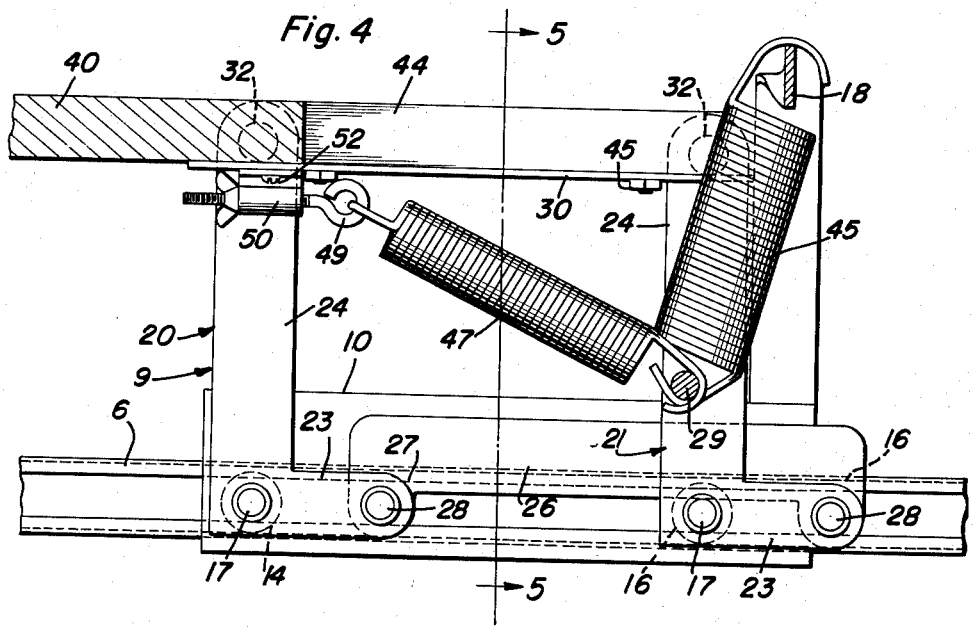
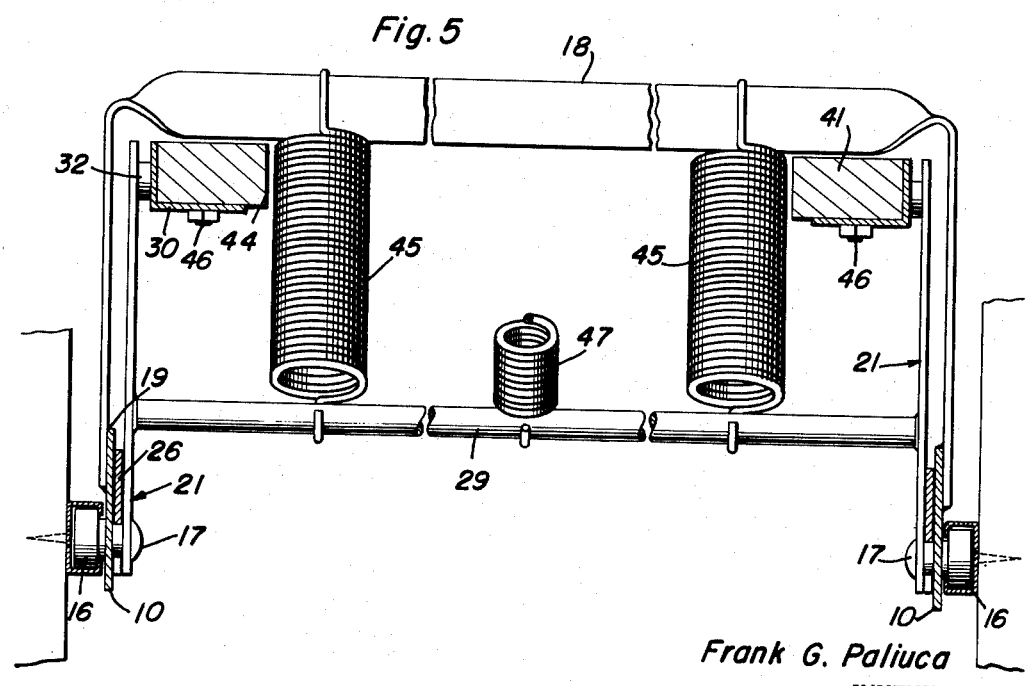
Frank G. Paliuca
INVENTOR.

Patented May 18, 1954

2,678,862

UNITED STATES PATENT OFFICE 2,678,862

TYPEWRITER SUPPORT

Frank G. Paliuca, Somerville, Mass., assignor to National Office Supply Mfg. Co., Inc., Boston, Mass., a corporation of Massachusetts Application October 1, 1951, Serial No. 249,023

1 Claim. (Cl. 312—28)

My invention relates to improvements in typewriter supports for use as equipment for typewriter desks.

The primary object of my invention is to provide a simple form of carriage for a typewriter supporting platform which is mounted in the storage compartment of a typewriter desk for travel forwardly and rearwardly therein to project the platform out of the compartment and retract the same into the compartment, respectively, and embodies spring loaded levers for elevating the projected platform which are locked against operation to elevate the platform until the carriage has been pulled forwardly to fully project the platform out of the compartment.

Another object is to provide a novel simple form of lock for the levers unlocked by pulling the carriage forwardly and by engagement with a part of the desk.

Other and subordinate objects, within the purview of my invention, together with the precise nature of my improvements will be readily understood when the succeeding description and claim are read with reference to the drawings accompanying and forming part of this specification.

In said drawings:

Figure 2 is a view in transverse vertical section, drawn to a smaller scale, with the carriage in its rearmost platform retracting position and the levers in platform lowering position;

Figure 3 is a similar view with the carriage in its forward limit of platform projecting movement and the levers in platform elevating position;

Figure 4 is a fragmentary enlarged view partly in longitudinal section and partly in side elevation of the carriage, one of the tracks, the platform, and parts associated with the levers, and the levers shown in platform elevating position;

Figure 5 is a view in vertical transverse section taken on the line 5—5 of Figure 4;

Figure 1:
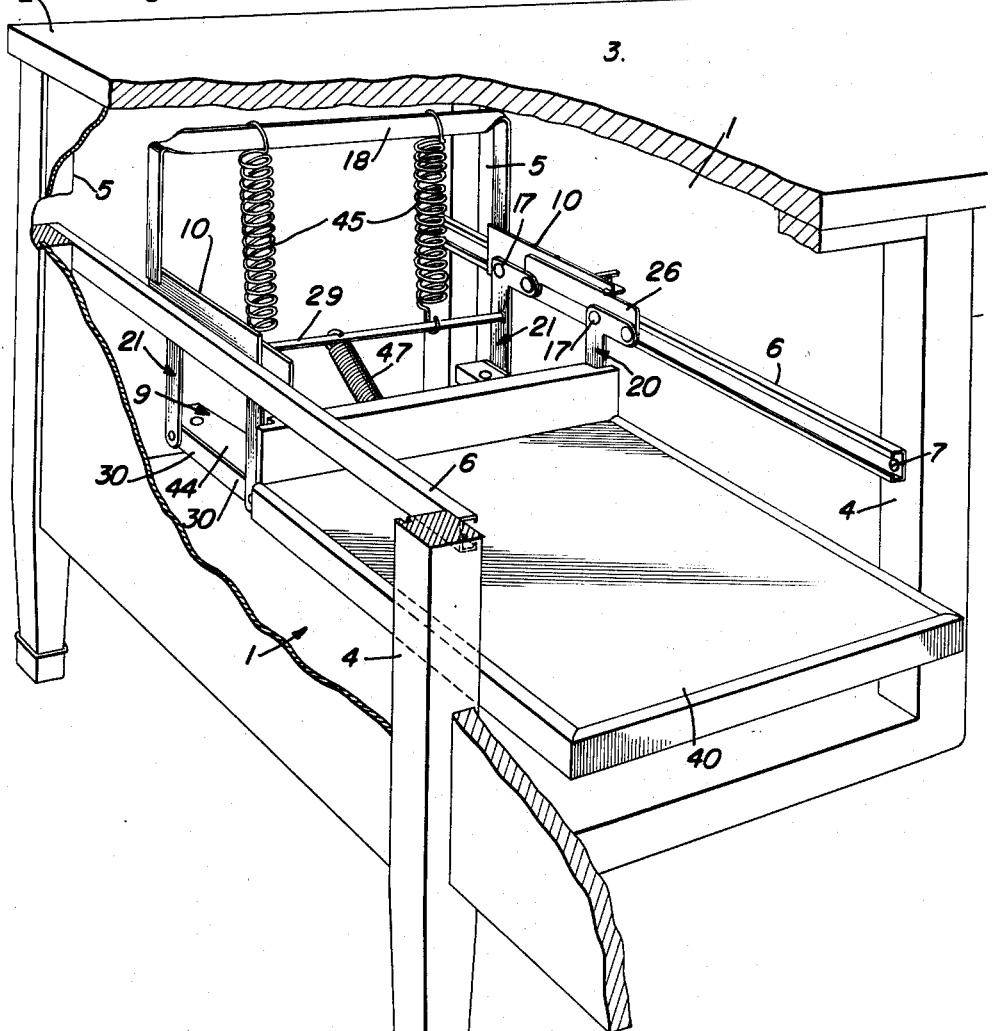
Figure 1 is a fragmentary view in perspective, partly broken away and shown in section, and illustrating my improved typewriter support mounted in the storage compartment of a typewriter desk with the platform lowered and partly retracted.

Referring to the drawings by numerals, my typewriter support is designed for mounting in the usual typewriter storage compartment 1 below the top 2 and at one end of the typewriter desk 3, the compartment having front and rear uprights 4, 5 at the corners thereof and at opposite sides of the compartment, the uprights 4 being formed by end legs of the desk.

The typewriter support comprises a pair of metal channel bar tracks 6 fixed horizontally to opposite sides of the compartment 1 with channel sides facing and by means of screws 7 turned into the front and rear ends 4, 5 of said tracks. The tracks 6 are disposed substantially midway between the top and bottom of the compartment 1.

A platform supporting carriage 9 is supported by the tracks 6 to travel forwardly and rearwardly in the compartment 1. The carriage 9 comprises a pair of vertical oblong plates 10 at opposite sides thereof extending endwise alongside the tracks 6 between said tracks and provided with rollers 14, 16 at the front and rear ends thereof running in the tracks 6 and mounted on studs 17 fixed in said plates 10. An inverted U-shaped yoke bar 18 upstanding from the rear ends of the plates 10 and welded thereto, as at 19, connects said plates together to travel in unison.

The carriage 9 further includes side pairs of front and rear bellcrank levers 20, 21 pivoted at the angles thereof on the studs 17 adjacent the front and rear ends of the plates 10 for vertical swinging movement and each comprising a short lever arm 23 and a long lever arm 24. The short lever arms 23 of each side pair of bellcrank levers 20, 21 are connected together to swing in unison by a horizontal link 26 having downturned ends 27, pivoted, as at 28, to said short lever arms 23. A cross rod 29 connects the long lever arms 24 of the rear bellcrank levers 21 for swinging in unison.

An angle bar 30 is pivotally connected at its ends, as at 32, to the terminals of the long lever arms 24 of each pair of bellcrank levers.

A platform 40 for supporting the typewriter 42 extends forwardly of the described carriage 9 with rear corner arms 44 bolted, as at 46, in the angle bars 30.

The bellcrank levers 20, 21 are swingable counterclockwise, as viewed in Figures 2, 3 and 4 until the long lever arms 24 are in depending lowered vertical position to lower the platform 40 from from elevated horizontal, typewriter operative position, and swingable clockwise, as viewed in said figures, to position the long lever arms 24 in raised upstanding position to elevate said platform 40 in typewriter operative position. The links 26 engage the front studs 17 to establish the platform lowering position of said bellcrank levers 20, 21 and similarly engage the rear studs 17 to establish the platform raising position of said levers. The carriage 9 is operated rearwardly in the compartment 1 when the platform 40 is lowered so as to house said platform 40 and typewriter 42 in said compartment 1, and is operative into forward position by pulling on said platform 40 to project the platform 40 out of said compartment.

A pair of coil springs 45 on opposite sides of the carriage 9, connected at the ends thereof to the top of the yoke bar 18, and to the rod 29 exert yielding pull on the long lever arms 24 of the rear bellcrank levers 20, 21, when said arms 24 are in depending platform lowering position, to maintain said arms in said position, said springs after initial swinging of said arms clockwise past an intermediate position and toward platform raising position acting to swing said arms 24, and hence the bellcrank levers 20, 21, into platform elevating position.

A third coil spring 47 is connected at one end to said rod 29 and has its other end connected to the rear edge of the platform 40 by an eyebolt 49 threadedly adjustable in a socket 50 secured to the platform 40 by screws 52. The pull of the spring 47, when the long lever arms 24 are in platform lowering position is directed rearwardly against said platform so as to assist in maintaining said arms 24, and hence the bellcranks 20, 21 in said position. However, when said arms 24 are swung to elevate the platform 40, and reach, together with the platform, a position slightly above the pivots 17, said spring 47 by exerting rearward pull against the platform 40 supplements the springs 45 in swinging said arms 24, which is to say the bellcrank levers 20, 21 into platform elevating position. As will be understood, the springs 45, 47 in swinging the bellcrank levers 20, 21 into platform elevating position balance the weight of the platform 40 and typewriter 42.

Figure 6:
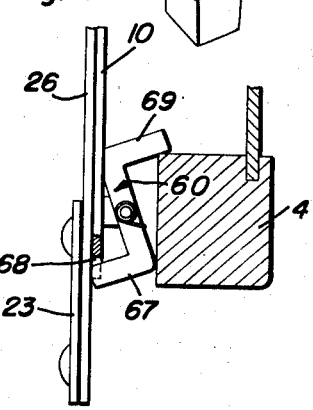
Figure 6 is a fragmentary view in plan of the lock means for the levers.
Figure 7:
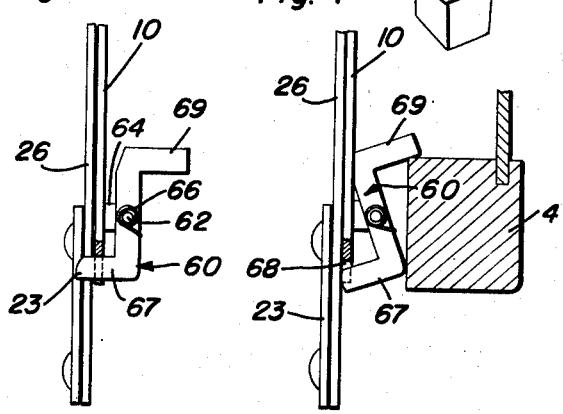
Figure 7 is a similar view illustrating the means for unlocking the lock.

Locking means is provided to prevent the bellcrank levers 20, 21 from swinging into platform elevating position comprising the following. A substantially Z-shaped latch dog 60 is pivoted intermediate its ends, as at 62, in horizontal position on a lateral lug 64 on the outside of one of the plates 10 adjacent its front end. A suitably arranged coil spring 66 on the pivot 62 operatively connected to said dog 60 yieldingly rocks said dog in one direction, counterclockwise, as viewed in Figures 6 and 7, to insert one end 67 of said dog through a slot 68 in said plate 10 and into overlying relation to the adjacent link 26, whereby said dog normally prevents upward swinging of said link 26 when the bellcrank levers 20, 21 are in platform lowering position, whereby to lock said levers in that position and the platform 40 lowered.

As the carriage 9 is moved forwardly, manually, into its limit of forward movement, the other end 69 of the locking dog 60 is brought into abutting engagement with one of the front uprights 4 and thereby swung in the opposite direction against the tension of the swing 66 to withdraw said end 67 from overlying relation to the adjacent link 12 and thereby unlock the bellcrank levers 20, 21 for swinging into platform elevating position.

The slot 68 establishes the locking position of the locking dog 60 and the end 67 engages the plate 10 carrying the dog and establishes the unlocking position of said dog. The end 69 of the locking dog 60 in its unlocking position, and by engagement with the aforementioned uprights 4 establishes the forward limit of movement of the carriage 9.

A feature of the described locking means for the bellcrank levers 20, 21 is that the carriage 9 must be maintained in its forward limit of movement while said bellcrank levers are swung into platform lowering position because, if the locking dog 60 is disengaged from its upright 4, said dog will interfere with swinging of the engaging link 20 in a manner to prevent swinging of the bellcrank levers 20, 21 into platform lowering position. Obviously, when the bellcrank levers 20, 21 swing into complete platform lowering position, the locking dog 60 will snap into locking position and the carriage 9 may then be moved rearwardly in the compartment 1 to house the platform 40 and typewriter 42.

The foregoing will, it is believed, suffice to impart a clear understanding of my invention, without further explanation, since the operation of the support has been set forth in connection with the description of the parts.

Manifestly, the invention, as described, is susceptible of modification, without departing from the inventive concept, and right is herein reserved to such modifications as fall within the scope of the appended claim.

Having described the invention, what is claimed as new is:

A typewriter support comprising a pair of opposite horizontal tracks, a carriage movable forwardly and rearwardly on said tracks and including a pair of side plates having front and rear track engaging rollers mounted on front and rear studs on the plates, a typewriter supporting platform, front and rear pairs of levers pivoted to said plates and platform for swinging in unison in opposite directions past an intermediate position to raise and lower said platform, links connecting the levers in the pairs for swinging in unison and vertically movable by swinging of the levers, spring means for swinging the levers in unison past said intermediate position in the direction to raise said platform, a fixed abutment in advance of said carriage, and a spring pressed Z-shaped locking dog on one side plate having a locking end normally overlying one of said links to lock said link to said plate against vertical movement in the lowered position of the platform, said dog being swingable into unlocking position and having an opposite end engageable with said abutment to swing said dog when said carriage is moved forwardly, said dog lying in a horizontal plane so that its locking end will overlie said one link and so that its opposite end is engageable with said abutment.

References Cited in the file of this patent

UNITED STATES PATENTS

| Number | Name | Date |
| --- | --- | --- |
| Re. 13,832 | Vaaler | Nov. 24, 1914 |
| 934,861 | Vaaler | Sept. 21, 1909 |
| 1,904,217 | Fox | Apr. 18, 1933 |
| 2,524,386 | Johnston | Oct. 3, 1950 |
| 2,557,735 | Fox | June 19, 1951 |